United States Patent
Fujimoto et al.

(10) Patent No.: US 9,600,874 B2
(45) Date of Patent: Mar. 21, 2017

(54) METHOD FOR EVALUATING CULTURE QUALITY

(71) Applicant: DAINIPPON SCREEN MFG. CO., LTD., Kyoto (JP)

(72) Inventors: Hiroki Fujimoto, Kyoto (JP); Sanzo Moriwaki, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 352 days.

(21) Appl. No.: 14/275,949

(22) Filed: May 13, 2014

(65) Prior Publication Data

US 2015/0086102 A1 Mar. 26, 2015

(30) Foreign Application Priority Data

Sep. 26, 2013 (JP) ................................. 2013-199865

(51) Int. Cl.
*G06K 9/00* (2006.01)
*G06T 7/00* (2006.01)
*G06K 9/03* (2006.01)

(52) U.S. Cl.
CPC ........ *G06T 7/0012* (2013.01); *G06K 9/00134* (2013.01); *G06K 9/03* (2013.01); *G06T 2207/10056* (2013.01); *G06T 2207/20021* (2013.01); *G06T 2207/30024* (2013.01)

(58) Field of Classification Search
None
See application file for complete search history.

(56) References Cited

U.S. PATENT DOCUMENTS

| | | | | |
|---|---|---|---|---|
| 5,757,953 A | * | 5/1998 | Jang | ...................... G06K 9/342 |
| | | | | 382/132 |
| 5,826,909 A | * | 10/1998 | Brommer | ............... A63C 11/00 |
| | | | | 280/602 |
| 7,907,769 B2 | * | 3/2011 | Sammak | ............ G06K 9/00127 |
| | | | | 382/133 |
| 8,189,900 B2 | * | 5/2012 | Sammak | ............ G06K 9/00127 |
| | | | | 382/133 |

(Continued)

FOREIGN PATENT DOCUMENTS

| | | |
|---|---|---|
| JP | 2011-229409 | 11/2011 |
| JP | 2013-027368 A | 2/2013 |

(Continued)

OTHER PUBLICATIONS

Office Action dated Aug. 18, 2015 for corresponding Japanese Patent Application No. 2013-199865.

*Primary Examiner* — Nancy Bitar
(74) *Attorney, Agent, or Firm* — Ostrolenk Faber LLP

(57) ABSTRACT

A culture quality evaluation method comprises: a first step of culturing a pluripotent stem cell under a predetermined culture condition and creating a sample; a second step of imaging a proliferated cell colony in the sample and accordingly capturing an original image; a third step of dividing the original image into smaller images of a predetermined size and calculating standard deviations of pixel values of pixels of the smaller images; and a fourth step of judging whether the sample is an acceptable sample based upon a ratio of a number of the smaller images whose values of the standard deviations are within a predetermined range to a total number of the smaller images.

5 Claims, 8 Drawing Sheets

(56) References Cited

U.S. PATENT DOCUMENTS

| | | | |
|---|---|---|---|
| 2010/0002929 A1* | 1/2010 | Sammak | G06K 9/00127 382/133 |
| 2011/0206262 A1* | 8/2011 | Sammak | G06K 9/00127 382/133 |
| 2012/0322152 A1* | 12/2012 | Raghunath | C12N 5/0068 435/369 |
| 2013/0236081 A1* | 9/2013 | Nakamura | G06K 9/00147 382/133 |

FOREIGN PATENT DOCUMENTS

| | | |
|---|---|---|
| WO | WO 2012/111236 A1 | 8/2012 |
| WO | WO 2012/115153 A1 | 8/2012 |

\* cited by examiner

100 μm

100 μm

100 μm

☐ :FEEDER CELL  ▒ : iPS CELL  ■ :DIFFERENTIATING CELL

METHOD FOR EVALUATING CULTURE QUALITY

CROSS REFERENCE TO RELATED APPLICATION

The disclosure of Japanese Patent Application No. 2013-199865 filed on Sep. 26, 2013 including specification, drawings and claims is incorporated herein by reference in its entirety.

BACKGROUND OF THE INVENTION

1. Field of the Invention

The present invention relates to a method for evaluating the quality of culture of pluripotent stem cells.

2. Description of the Related Art

Pluripotent stem cells which can differentiate into various tissues are drawing an increasing attention in the fields of medicine and bioscience including regenerative medicines and drug discovery for instance. To use pluripotent stem cells for the purpose of research, treatments, etc., it is necessary to increase the number of the cells without damaging the pluripotency of the cells and culture for this purpose is called "maintenance culture." Pluripotent stem cells may however for some reason lose their pluripotency and differentiate into cells which have only a particular function while being cultured and maintained. Therefore, further research is in progress to find a culture condition under which a pluripotent stem cell can be stably cultured while still retaining its pluripotency.

The cell evaluation technique described in JP2011-229409A for example is one of methods proposed for evaluating the state of cultured pluripotent stem cells. According to this technique, the state of differentiation of pluripotent stem cells is evaluated based upon the feature value morphology of cell colonies included in captured images of cultured pluripotent stem cells.

According to the conventional technique above, in a condition that a plurality of cells are cocultured, the cells are evaluated based on how the feature value of a colony which needs to be evaluated is related to the feature values of cells around the colony. Specifically describing this, through image analysis of a captured image of a sample, colonized portions of cells are extracted, and in accordance with the calculated feature values of the images of the colonized portions and the surrounding areas, the state of the cell colonies is evaluated.

Meanwhile, for the purpose of judging whether a culture condition is favorable or poor, rather than detailed information regarding each colony, the state of culture of a sample as a whole needs to be comprehensively understood. To this end, more direct evaluation utilizing a characteristic which can be seen from an image is more desirable than relative evaluation which involves comparison of extracted characteristics of multiple sections within the image with each other. However, no such evaluation method has been established up to today. Evaluation has so far been subjective and dependent upon visual observation by an operator, inevitably leading to varied evaluation results. This has given rise to the need for an established technique for objective and simple evaluation of the quality of a cultured sample.

SUMMARY OF THE INVENTION

The invention was made in light of the problem described above. An object of the invention is to provide a technique for simply and objectively determining whether the quality of culture is favorable or poor and for evaluating the quality of culture without variations.

A culture quality evaluation method of the present invention comprises: a first step of culturing a pluripotent stem cell under a predetermined culture condition and thereby creating a sample; a second step of imaging a proliferated cell colony in the sample and accordingly capturing an original image; a third step of dividing the original image into smaller images of a predetermined size and calculating standard deviations of pixel values of pixels contained in each one of the smaller images; and a fourth step of judging that the sample is an acceptable sample when a ratio of a number of the smaller images whose values of the standard deviations are within a predetermined range to a total number of the smaller images is equal to or smaller than a predetermined threshold value and judging that the sample is an unacceptable sample when the ratio is beyond the threshold value.

An indicator for evaluation of the quality of maintenance culture of pluripotent stem cells is how much differentiation of cells can be suppressed during culture. As described in detail later, the inventors of the invention discovered the pixel value distribution in an image of a cell colony consisting only of pluripotent stem cells was different from that in an image of a cell colony containing differentiated cells as well and it was possible to distinguish an image containing differentiated cells to or beyond a certain extent utilizing the feature values. That is, in an image of a cell colony consisting only of pluripotent stem cells, the texture within the image is relatively homogeneous with merely small variations of pixel values. On the contrary, an image of a cell colony containing differentiated cells has more diversified texture with large variations of pixel values. Thus, the degree to which pixel values vary is different depending upon the type of cells. It is therefore possible to evaluate a sample, using the value of the standard deviation of the pixel values of pixels contained in an image.

In culture under a culture condition for maintenance culture, a differentiated cell occupies only a limited area of an image of a sample. This is why it is difficult to detect differentiation of a cell even using the standard deviation of pixel values of the entire image of the sample. Noting this, according to the invention, an original image is divided into smaller images for each one of which the standard deviation of pixel values is calculated. In this manner, it is possible to segregate, based upon the values which the standard deviations take, the smaller images in which differentiated cells occupy a large area from the images in which differentiated cells occupy only a small area. When the images which are likely to contain differentiated cells account for a big portion of the total area, it is possible to conclude that a number of differentiated cells have been created, that is, the culture is not suitable as maintenance culture.

Using the structure according to the invention, it is possible to judge in accordance with the principle described above automatically and quantitatively only from pixel values, which represent information directly obtained from an original image, and the standard deviations of the same. Therefore, it is possible to evaluate the quality of culture simply and without variations.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFFERED EMBODIMENTS

Figure 1:
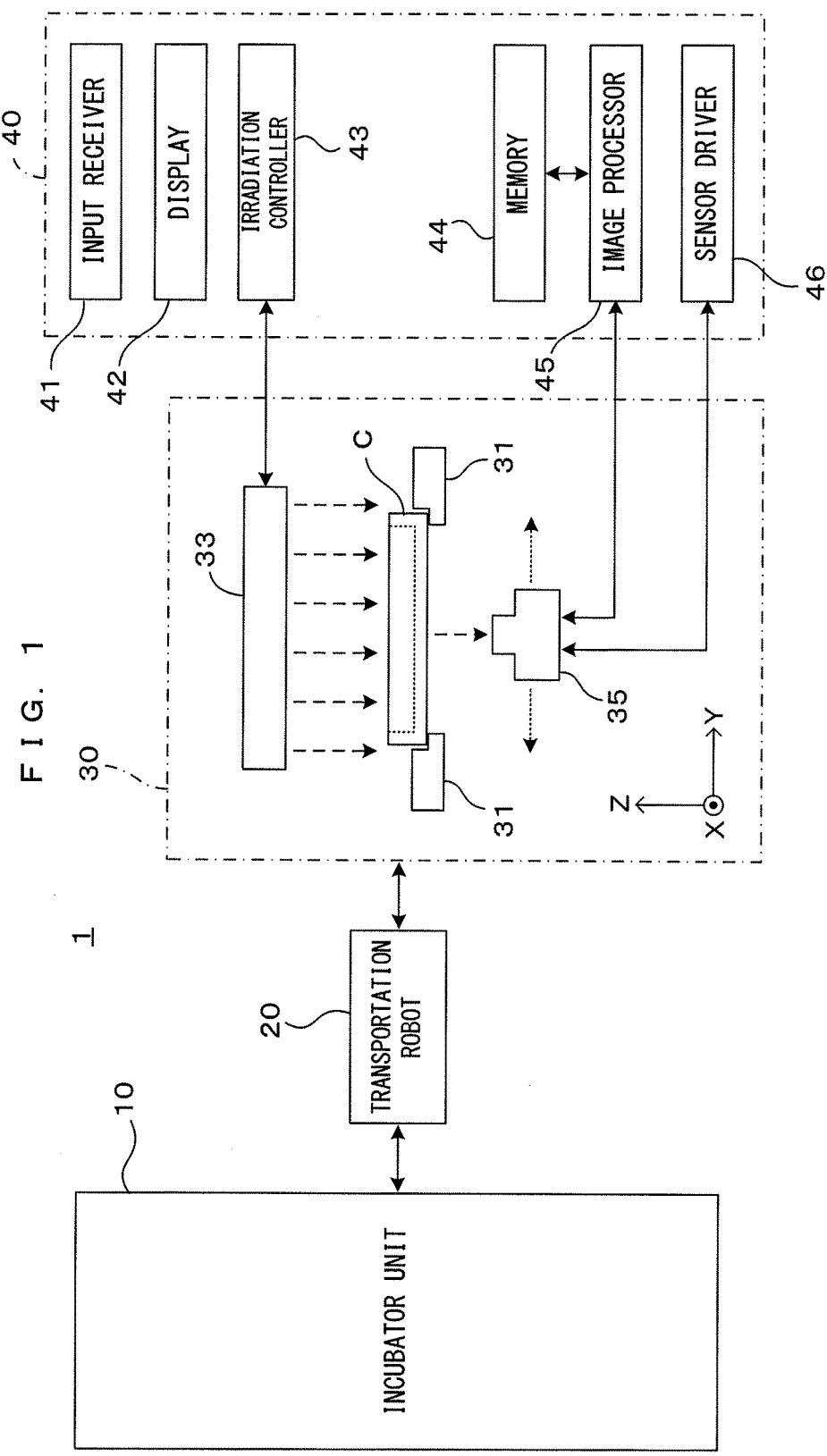
FIG. 1 is a drawing which shows an example of the structure of a culture system to which the culture quality evaluation method according to the invention can be applied.

FIG. 1 is a drawing which shows an example of the structure of a culture system to which the culture quality evaluation method according to the invention can be applied. The culture system 1 comprises an incubator unit 10 equipped with a culture chamber in which a predetermined temperature/humidity environment is maintained, an imaging unit 30 which images a sample unloaded from the incubator unit 10, a controller unit 40 which controls the imaging unit 30, and a transportation robot 20 which transports a sample between the incubator unit 10 and the imaging unit 30.

The incubator unit 10 is for the purpose of culturing, in a constant temperature/humidity environment, a cell, a microorganism, etc. on a culture medium injected into a known sample container such as a shallow dish, a well plate having a plurality of wells, etc. Many such incubator apparatuses have been made commercially available, and such a known incubator apparatus may be used in the embodiment of the invention. The incubator unit will not therefore be described in detail.

The imaging unit 30 comprises a holder 31 which approximately horizontally supports a sample container C which comes from the incubator unit 10, an irradiator 33 which is disposed above the sample container C held by the holder 31 and irradiates illumination light upon the sample container C, and an imager 35 which is disposed on the opposite side of the irradiator 33 to the sample container C held by the holder 31, i.e., below the sample container C and images the sample container C from below. The imager 35 receives light irradiated from the irradiator 33 and transmitted by the bottom surface of the sample container C, and images a sample which is inside the sample container C. For clear indication of the direction in the imaging unit 30, an XYZ-coordinate system as that shown in FIG. 1 is set. The XY-plane represents a horizontal plane, whereas the Z-axis represents the vertical axis.

A linear image sensor is incorporated within the imager 35 such that the longitudinal direction of the linear image sensor is the X-direction which is perpendicular to the plane of FIG. 1. The imager 35 moves in the Y-direction along the bottom surface of the sample container C while receiving at its linear image sensor the transmitted light from the bottom surface of the sample container C. A two-dimensional image of the sample is consequently obtained.

The controller unit 40 comprises an irradiation controller 43, a sensor driver 46, an image processor 45, and a memory 44. The irradiation controller 43 controls operations of the irradiator 33. The sensor driver 46 moves the imager 35 horizontally in the Y-direction. The image processor 45 executes various types of image processing in accordance with an image signal received from the imager 35. The memory 44 saves and stores pre- and post-processing image data and various types of other data. Other than these, the controller unit 40 comprises an input receiver 41 on which an operator operating the culture system 1 enters operation instructions, and a display 42 which informs, using visual information, the operator of the operation status of the system, a processing result and the like.

In the culture system 1 having the structure described above, inside the sample container housed in the incubator unit 10, a pluripotent stem cell such as an iPS cell (induced pluripotent stem cell) is cultured and the quality of the cell is evaluated. In more detailed words, the pluripotent stem cell is disseminated in a culture medium injected into in the sample container and cultured in the incubator unit 10. The sample container is periodically transferred to the imaging unit 30 from the incubator unit 10, and images of cultured cell colonies are captured. The image processor 45 performs appropriate image processing of thus obtained images for the purpose of evaluation of the quality of the culture.

The quality of the culture in this context means a scale which indicates how favorable or poor a culture condition for maintaining and culturing the pluripotency of the pluripotent stem cell is. The longer period the pluripotency is maintained, the better the quality of the culture is. The culture condition is expressed by combination of the culture medium, the type and the quantity of a reagent added to the culture medium, the type and the quantity of feeder cells, the ambient temperature, the humidity level, etc.

During culture of a pluripotent stem cell, the cell which should proliferate while maintaining its pluripotency may differentiate into cells which have a particular function because of some trigger, in which case the cell loses its pluripotency. For stable maintenance culture of a pluripotent stem cell, it is necessary to find a culture condition which discourages differentiation of the cell. A conventional method to this end is that an operator visually observes a cultured sample, presumes the degree of differentiation and judges whether the culture condition is favorable or poor. The operator's subjectivity may therefore lead to varied judgment results. The culture quality evaluation process according to the invention, relying upon a quantitative decision which is free from a subjective judgment, realizes objective and automatic evaluation of whether the culture quality is favorable or poor. The flow of the culture quality evaluation process with the embodiment of the invention applied to maintenance culture of an iPS cell will now be described.

Figure 2:
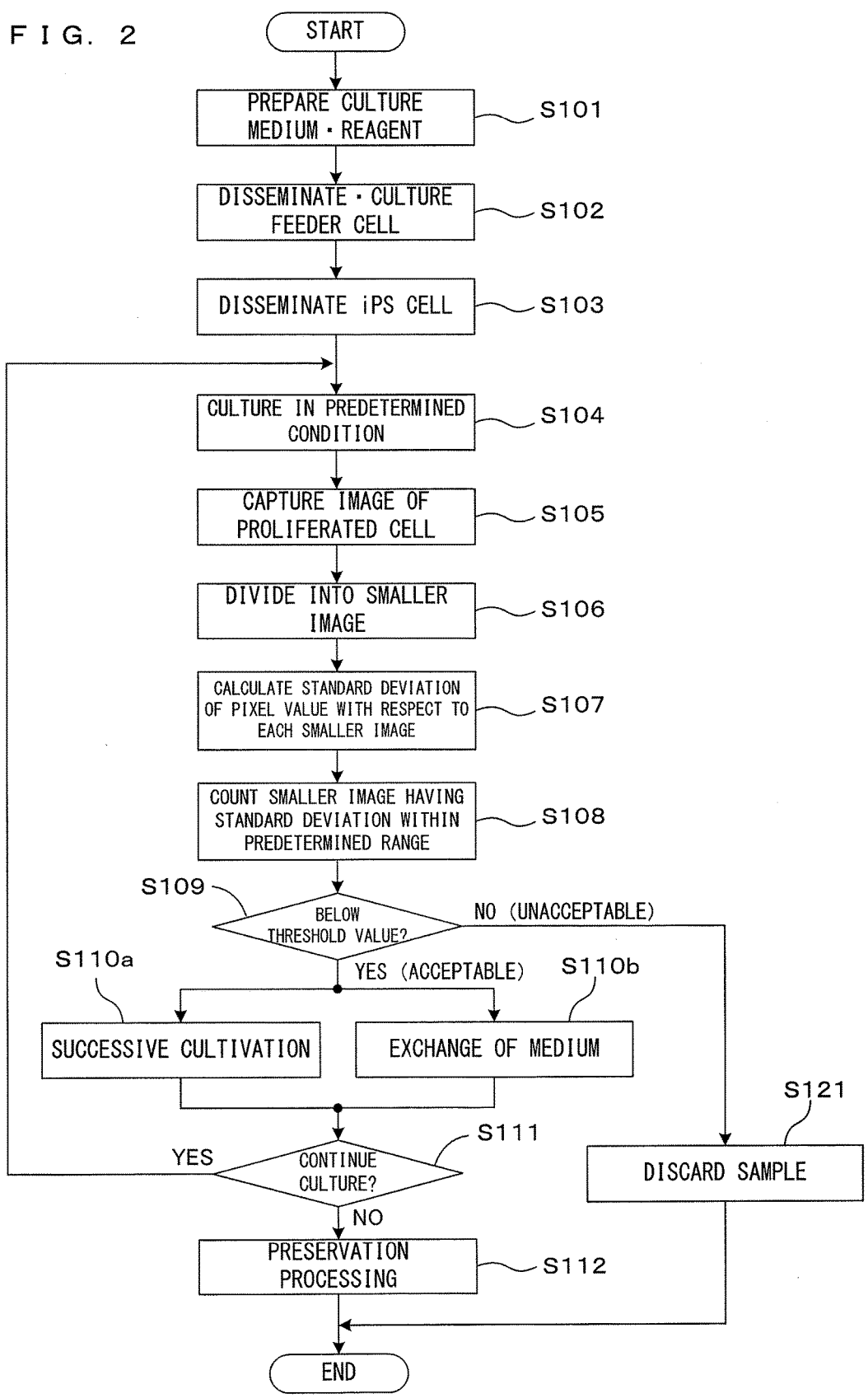
FIG. 2 is a flow chart of the culture quality evaluation process.

FIG. 2 is a flow chart of the culture quality evaluation process. First, an operator prepares a culture medium and a reagent which needs be added to the culture medium (Step S101). That is, the culture medium of an appropriately selected type is injected in an appropriately selected amount into the sample container C which may be a dish or a well plate. Next, a feeder cell is disseminated in thus prepared culture medium and cultured under a predetermined condition (Step S102), and further an iPS cell is disseminated, whereby a sample is obtained (Step S103). The sample created in this manner is cultured inside the incubator unit 10 which is maintained to have a predetermined temperature/humidity environment (Step S104).

After a predetermined period of time, the transportation robot 20 unloads the sample container C from the incubator unit 10 and transfers it to the imaging unit 30, and an image of a proliferated cell colony inside the sample container C is captured (Step S105). In more details, the sample container C is transferred onto the holder 31 inside the imaging unit 30. As the imager 35 horizontally moves under the irradiation light from the irradiator 33 along the bottom surface of the sample container C in the Y-direction, an image of the sample container C as viewed from the bottom surface is obtained. This image will be referred to as an original image in the following. Thus obtained image data are saved and stored in the memory 44. The original image obtained in this fashion is divided into smaller images and processed by the image processor 45 (Step S106).

It is desirable to set the image capture range for imaging the sample such that cells are distributed all over the original image. This is because a blank (background) area where no cell exists does not contribute to the judgment of whether the culture condition is favorable or poor, and as the embodiment of the invention requires statistical processing of pixel values within the divided smaller images for the purpose of judgment, creating as many cell-containing smaller images as possible from the original image is desirable.

Figure 3A:
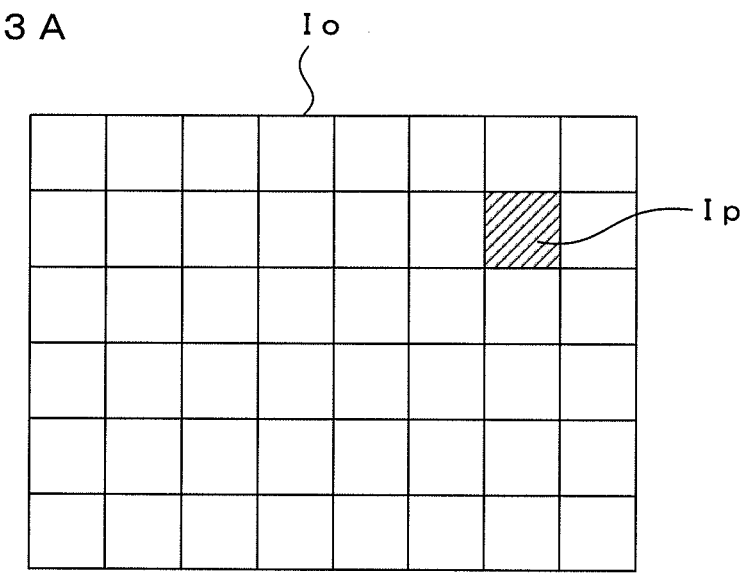
FIGS. 3A and 3B are drawings of the relationship between the original image and the smaller images.
Figure 3B:
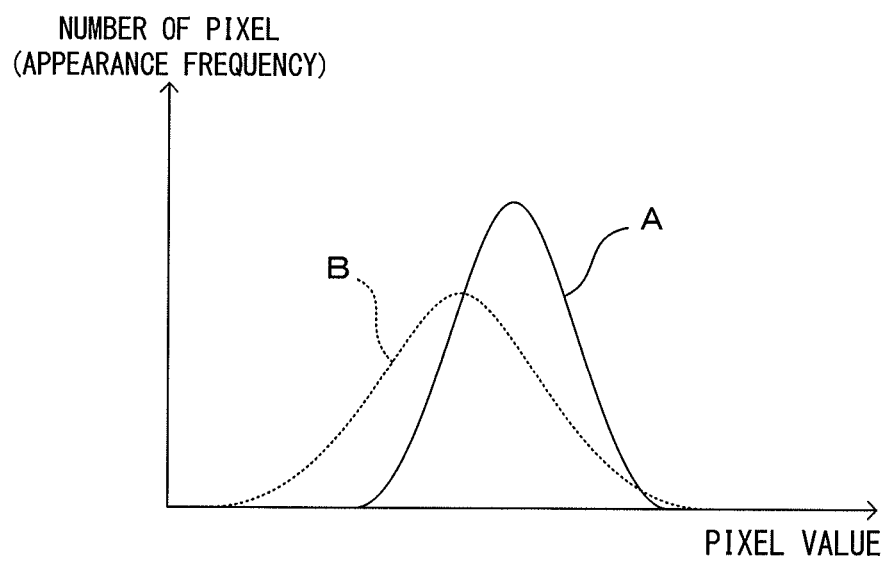

FIGS. 3A and 3B are drawings of the relationship between the original image and the smaller images. The size of the original image Io shown in FIG. 3A corresponds to the size of the bottom surface of the sample container C, and one side of the original image is for instance approximately from a few millimeters to scores of millimeters. Meanwhile, the size of each smaller image Ip is selected so that more than one cells are included in the smaller image Ip. Since the size of a somatic cell is approximately from a few micrometers through scores of micrometers, one side of each smaller image Ip may be a few hundred micrometers for example. The "size" of an image as referred to in this specification means the size of a region of a sample which is included in a captured image of the sample, which is a different concept from the apparent size of an image as perceived by human beings which changes when the captured image is enlarged or shrank.

Each smaller image Ip obtained by division is formed by a plurality of pixels. For instance, when the resolution for imaging is 2,400 dpi (dots per inch) and the size of the smaller images Ip is that one side is 0.2 millimeter, one smaller image Ip contains approximately 360 pixels.

The image processor 45 calculates the standard deviation of pixel values (luminance values) of pixels contained in each smaller image Ip (Step S107). As represented by the curves A and B in FIG. 3B, the distribution of the pixel values is different due to the different texture included in each smaller image Ip, and so is the standard deviation value. According to the findings by the inventors of the invention described in detail later, when the smaller images Ip contain primarily iPS cells, variations of the pixel values are relatively small and the standard deviations take small values as denoted by the curve A in FIG. 3B. On the other hand, when the smaller images Ip contain a number of differentiated cells, variations of the pixel values are relatively large and the standard deviations take large values as denoted by the curve B in FIG. 3B.

While a specific derivation method will be described in detail later, according to the embodiment, for each cell type among iPS cells, feeder cells and differentiated cells, how much the pixel values vary within the images of these cells captured in advance is calculated. From the calculation result, the range of the standard deviation of pixel values which an image containing particularly many differentiated cells can have is specified beforehand. When the standard deviation of the pixel values of the smaller image Ip, which is one of the cut pieces of the original image obtained by imaging the sample to be evaluated, is within this range, the probability that this smaller image Ip contains many differentiated cells is presumed to be high. Whether the culture quality is favorable or poor is then judged in accordance with the number of the smaller images Ip which are thus concluded to contain many differentiated cells.

The specific process will now be described with reference to FIG. 2 again. From among the smaller images Ip each of which is a piece of the original image Io, how many of them have the standard deviation of the pixel values staying within the range above, which is specified from the image of differentiated cells, is counted (Step S108). How large a region occupied by differentiated cells is within the original image Io as a whole is accordingly presumed. That is, it is presumed that the higher the ratio of the number of the smaller images Ip counted in at Step S108 is to the total number of the smaller image Ip, the larger proportion the region occupied with differentiated cells accounts for within the original image Io. The presence of many differentiated cells means that the purpose, which is maintenance of the pluripotency during culture, is not attained.

Noting this, the ratio of the number of the smaller images Ip counted in at Step S108 to the total number of the smaller image Ip created from the original image Io is calculated. When the ratio is equal to or lower than a predetermined threshold value, it is determined that the sample is an acceptable sample, whereas when the ratio is beyond the threshold value, it is determined that the sample is an unacceptable sample (Step S109). The display 42 displays this judgment, whereby the operator is informed of the judgment. Determination that the sample is an acceptable sample means the probability that the pluripotency of the cultured cells is maintained is high. Therefore, the sample is then subjected to successive cultivation (Step S110a) or exchange of the medium (Step S110b) as needed. When further continuation of culture is necessary (YES at Step S111), the sample container C is loaded back into the incubator unit 10 for further culture and unloaded from the incubator unit 10 periodically for evaluation of the quality of the culture.

When further continuation of culture is unnecessary (NO at Step S111), e.g., a sufficient number of iPS cells are obtained through culture, the sample is preserved by an appropriate preservation method (Step S112) which may be cryopreservation until the sample becomes needed for use next time.

When it is determined that the sample is an unacceptable sample, the sample is discarded (Step S121). Alternatively, cells in a region which appears to be differentiated cells may be removed, cells in an effective region alone may be transferred to other sample container, or otherwise appropriate disposition may be carried out, to thereby use the sample for culture again. However, for the purpose of merely judging whether the culture condition is favorable or poor, once it is learned that the culture condition under which the sample has been cultured is likely to be unsuitable to maintenance culture, further continuation of culture is unnecessary.

As described above, in the culture quality evaluation process according to the embodiment, whether the quality of culture is favorable or poor is judged based upon pixel values which can be directly obtained from the captured image and the values of the standard deviations calculated for the respective smaller images Ip. This realizes objective and quantitative evaluation which is not dependent upon an operator's personal view, and hence, judgment which does not vary. While the conventional technique described above requires the process of extracting a colonized portion from an image, calculating the value of the feature value in this portion and that of the surrounding section, and comparing these values with each other, it is possible according to the embodiment to easily and more directly judge.

A method of setting processing parameters in the culture quality evaluation process above will now be described. Processing parameters which must be set in advance in the culture quality evaluation process above include:

(1) the size of each smaller image Ip;

(2) the range of the standard deviation value of pixel values which tells that the smaller image Ip contains a number of differentiated cells; and (3) the threshold value for the ratio of smaller images which is used to segregate an acceptable sample from an unacceptable sample.

Judgment regarding whether the sample is an acceptable sample or an unacceptable sample may become different depending upon how these parameters are set, and when the parameters are set inappropriately, the probability of erroneous judgment may increase.

Of the parameters, the parameter (3) should be set in accordance with the level of the pluripotency maintaining capability which the culture condition to be evaluated must exhibit, i.e., to which extent the probability of cell differentiation with time is acceptable, and should be determined artificially in accordance with the intended use and the purpose of culture. In the meantime, the parameters (1) and (2), when set by a more objective method, can reduce the probability of erroneous judgment. The principle of the setting method and the specific content of the process will now be described.

Figure 4A:
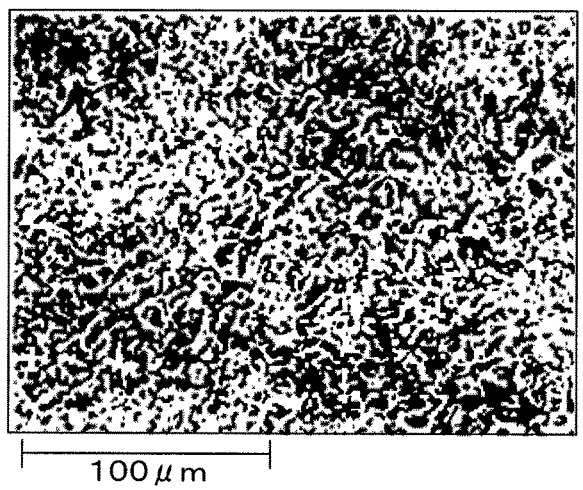
FIGS. 4A through 4C are drawings which show examples of images obtained by imaging various types of cells.
Figure 4B:
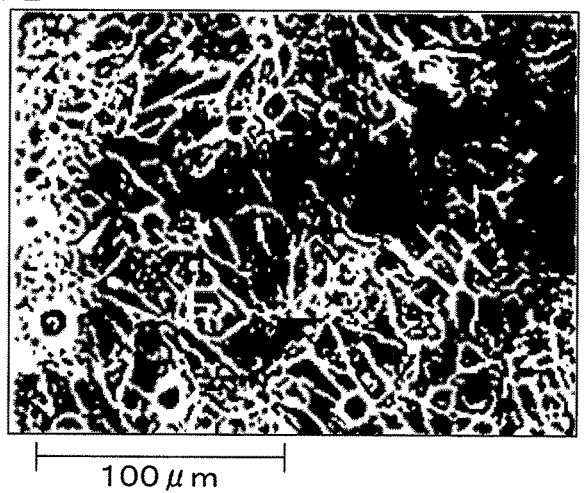
Figure 4C:
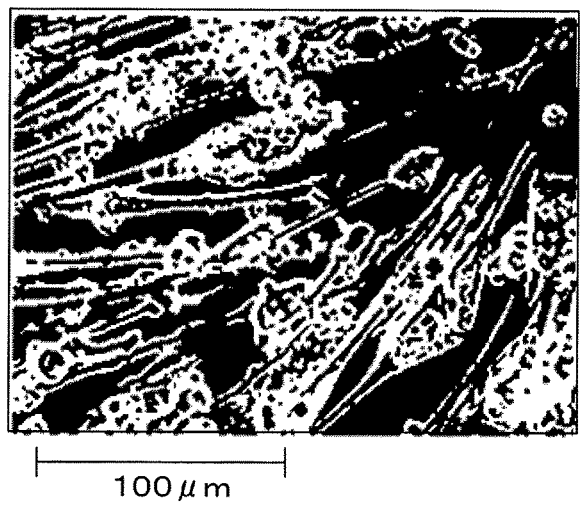
Figure 5:
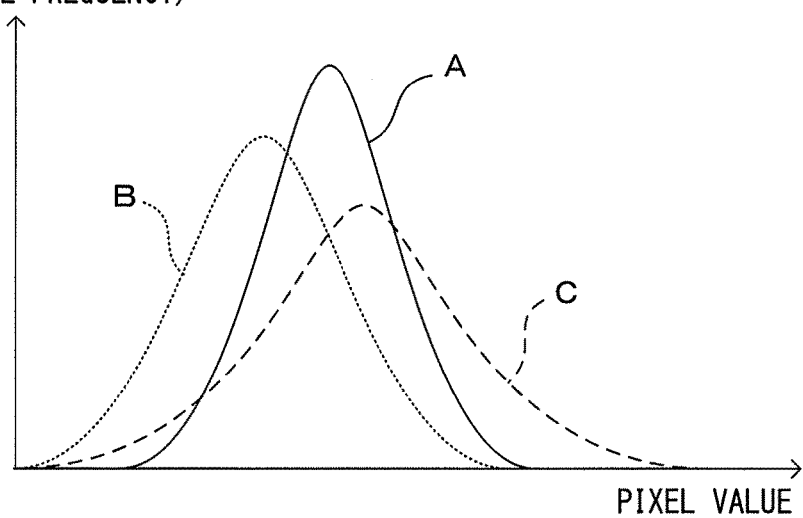
FIG. 5 is a drawing which shows an example of the distribution of pixel values in each one of these images.

FIGS. 4A through 4C are drawings which show examples of images obtained by imaging various types of cells. Describing more particularly, FIG. 4A shows the image of iPS cells, FIG. 4B shows the image of differentiated cells and FIG. 4C shows the image of feeder cells. These images have the same size. FIG. 5 is a drawing which shows an example of the distribution of pixel values in each one of these images.

iPS cells, with the diameter of approximately 5 micrometers, generally have smaller sizes than somatic cells, and size variations of iPS cells are small. For this reason, the image of iPS cells, as shown in FIG. 4A, looks densely filled up with relatively fine and homogeneous texture, and variations of the pixel values are relatively small as denoted by the curve A in FIG. 5. In the image of differentiated cells shown in FIG. 4B, while the cells are each large, they are sparse than iPS cells and distributed more densely than feeder cells which will be described next. Hence, variations of the pixel values are in an intermediate state between iPS cells and feeder cells. FIG. 5 shows the pixel value distribution as the curve B. In the image of feeder cells shown in FIG. 4C, the cells are larger than iPS cells, they are more sparsely distributed than iPS cells and differentiated cells, and the pixel value distribution is wider than those of iPS cells and differentiated cells. FIG. 5 shows the pixel value distribution as the curve C.

According to the findings by the inventors of the invention, in calculation of the standard deviation of pixel values, depending upon the size of an image to be evaluated, the value of the standard deviation becomes different. That is, in the process of dividing a captured image of differentiated cells for instance into smaller images and calculating the standard deviation of pixel values of each smaller image, the value which the standard deviation takes becomes different depending upon the size of the smaller image. Hence, at the stage of classifying images based upon the values of the standard deviations of pixel values, it is necessary to properly set the size of the smaller images such that the values of the standard deviations will show a significant difference among the different types of cells.

Figure 6:
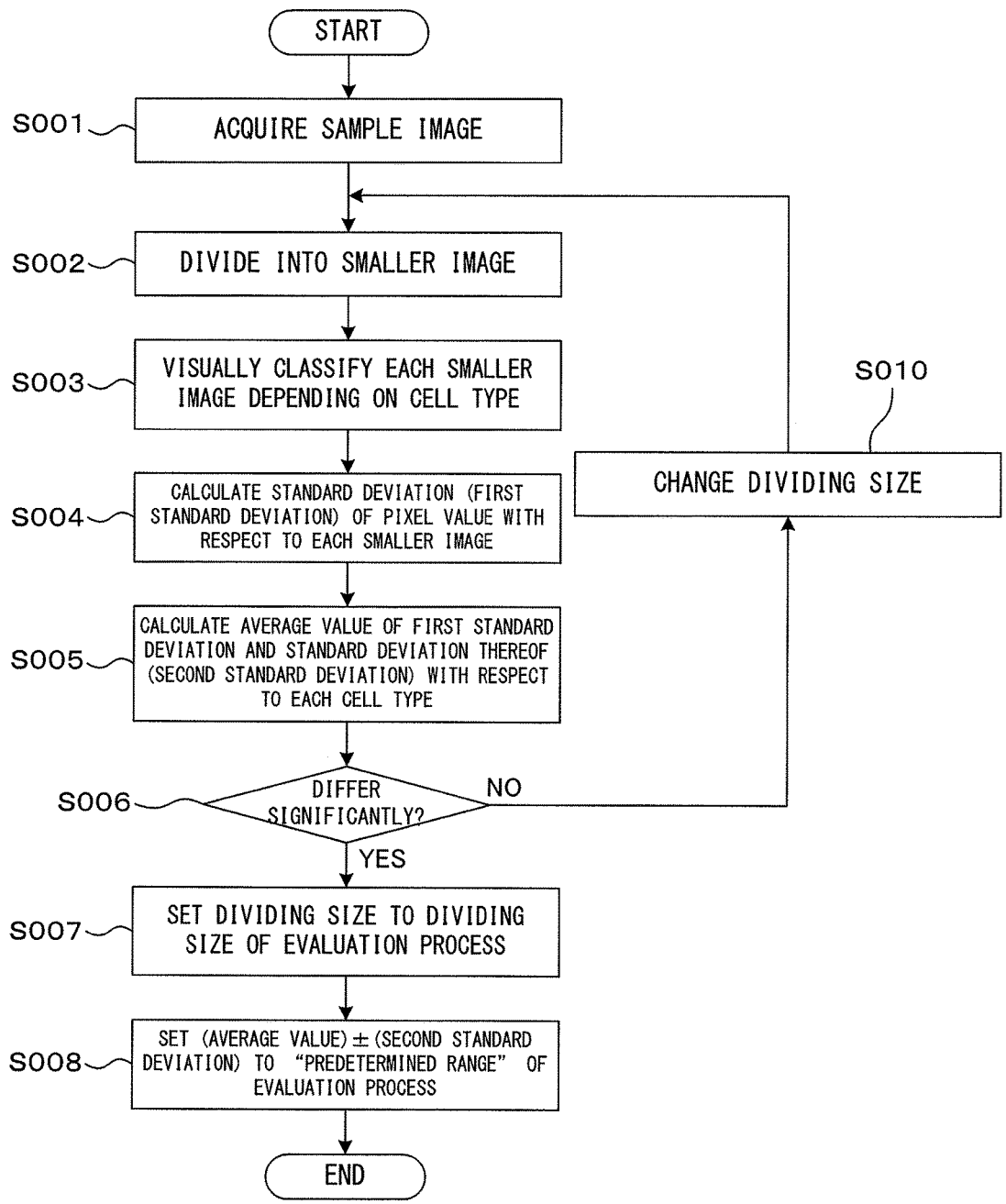
FIG. 6 is a flow chart of the process of setting the size of the smaller images.
Figure 7A:
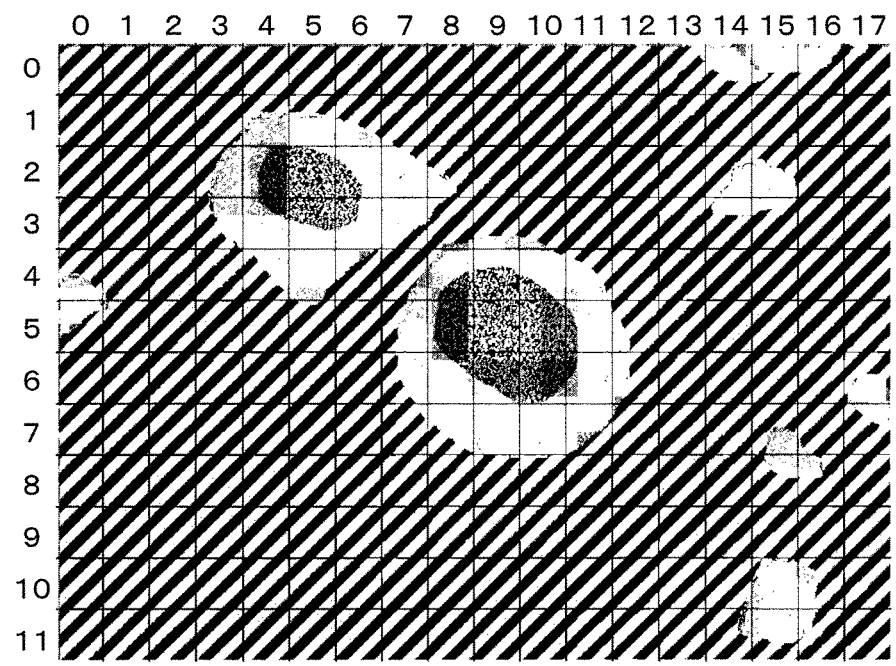
FIGS. 7A and 7B are drawings which show examples of sample images which are used in this process.
Figure 7B:
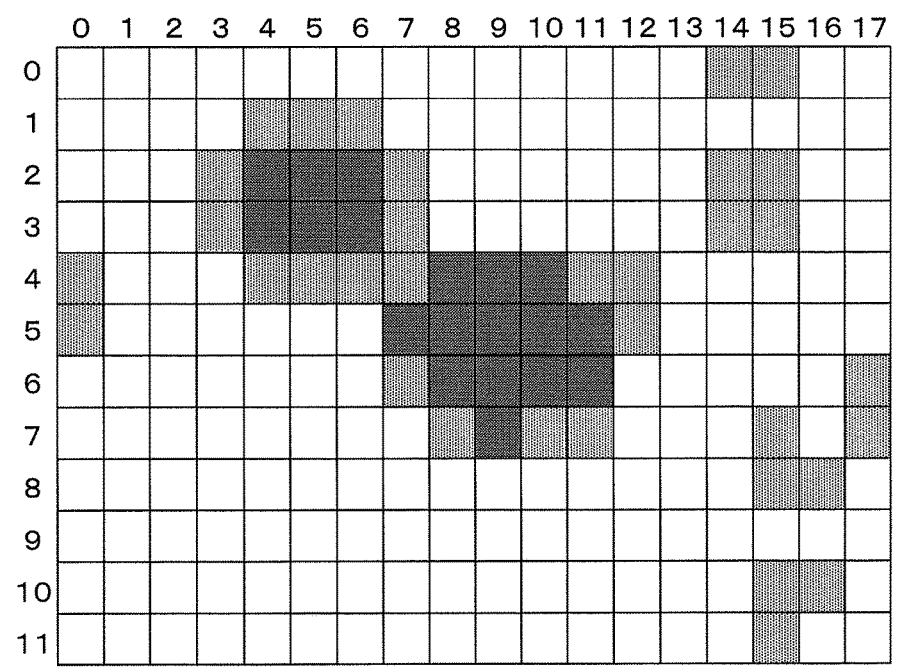

FIG. 6 is a flow chart of the process of setting the size of the smaller images. FIGS. 7A and 7B are drawings which show examples of sample images which are used in this process. This process is executed as a preparation step prior to the culture quality evaluation process described above. First, as sample images, an image of iPS cells, an image of feeder cells and an image of differentiated cells are acquired (Step S001). Sample images may be different images by cell type, or alternatively, cells of these types may be all included in one sample image. When one image contains cells of different types, it is desirable that the distributions representing the respective cell types can be visually recognized within the sample image.

FIG. 7A shows a schematic example of such a sample image, and schematically shows the state that iPS cells, feeder cells and differentiated cells all appear within the image. From the texture of the image, it is assumed to be visually recognizable that the feeder cells occupy most regions and the iPS cells and the differentiated cells are locally present.

The sample image thus acquired is divided into smaller images which have an appropriate size (Step S002). Since the optimal size of the smaller images is unknown at this stage, the size of the smaller images may be set to an initial size set beforehand for instance. In FIG. 7A, the boundaries of the smaller images are denoted as the grid lines, and row numbers and column numbers are assigned to the smaller images for identification of the smaller images.

Next, an operator visually observes each one of the smaller images, and depending upon which type of cells among iPS cells, feeder cells and differentiated cells is dominant in the respective smaller images, classifies the smaller images by cell type (Step S003). At this stage, when classification is difficult on any smaller image, e.g., when cells of the multiple types are contained in the smaller image to about the same extent, that smaller image may be excluded from the subsequent part of the process. FIG. 7B shows an example of the classification result. In FIG. 7B, the white cells are indicative of the smaller images which primarily contain feeder cells, the lightly shadowed cells are indicative of the smaller images which primarily contain iPS cells, and the heavily shadowed cells are indicative of the smaller images which primarily contain differentiated cells.

For each one of thus classified smaller images, the standard deviation of the pixel values of pixels contained in the smaller image is calculated (Step S004). The standard deviations calculated at this stage will be referred to as "the first standard deviations" in the following, which should be distinguished from the standard deviation calculated later. This is followed by calculation of the average value of the first standard deviations among the smaller images which are classified to be of the same cell type and calculation of the standard deviation of the first standard deviations (Step S005). The standard deviation calculated at this stage corresponds to "the standard deviation of the standard deviations of the pixel values (that is, the first standard deviations)" which will be referred to as "the second standard deviation" below so as to distinguish from the first standard deviations. Assuming that the first standard deviations of the smaller images, namely, the values which the standard deviations of the pixel values take, represent the feature values of the smaller images, the second standard deviation indicates to which extent the feature values of the smaller images classified to be of the same cell type vary.

Figure 8A:
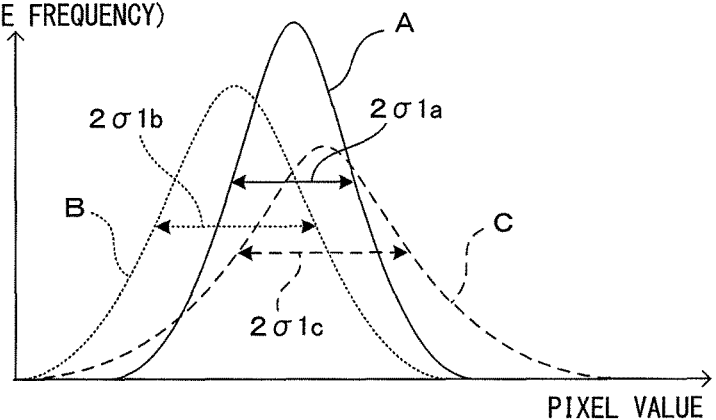
FIGS. 8A through 8C are drawings for describing a difference between the first standard deviations and the second standard deviation.
Figure 8B:
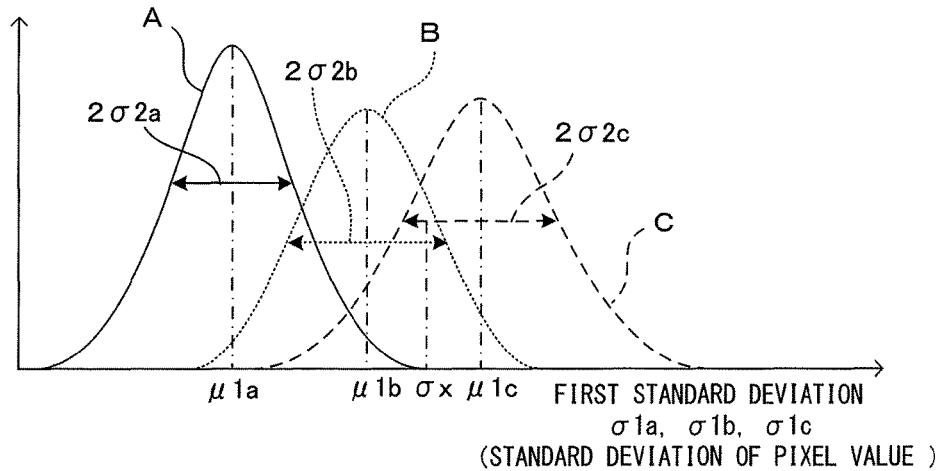
Figure 8C:
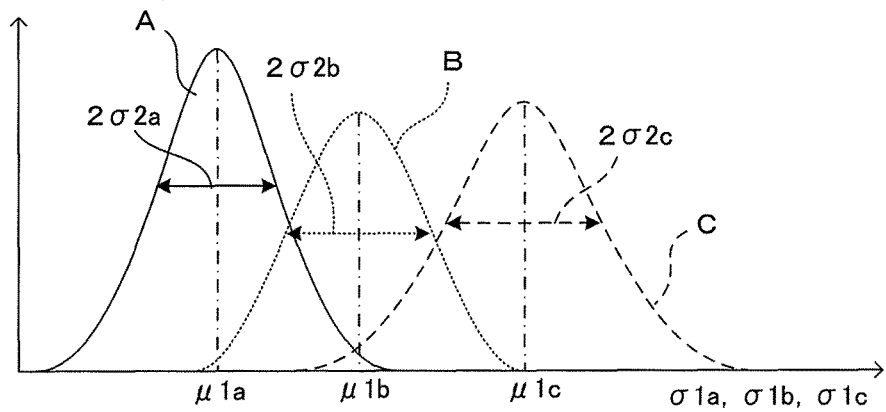

FIGS. 8A through 8C are drawings for describing a difference between the first standard deviations and the second standard deviation. First, the graph in FIG. 8A is the same as the graph in FIG. 5, and shows the examples of the standard deviations (the first standard deviations) of the pixel values of the pixels within one smaller image. The curve A is indicative of the distribution of the pixel values within one smaller image which is classified to be of iPS cells. The curve B is indicative of the distribution of the pixel values within one smaller image which is classified to be of differentiated cells. The curve C is indicative of the distribution of the pixel values within one smaller image which is classified to be of feeder cells. For the distributions denoted at the curves A, B and C, the first standard deviations $\sigma 1a$, $\sigma 1b$ and $\sigma 1c$ are calculated respectively. For instance, the first standard deviations $\sigma 1a$ corresponding to the curve A indicate variations of the pixel values within one smaller image which is classified to be of iPS cells. Similarly, the first standard deviations $\sigma 1b$ and $\sigma 1c$ corresponding to the curves B and C respectively indicate variations of the pixel values within one smaller image which is classified to be of differentiated cells and variations of the pixel values within one smaller image which is classified to be of feeder cells. In this example, the relationship $\sigma 1a < \sigma 1b < \sigma 1c$ is satisfied.

For example, among the plurality of smaller images classified to be of iPS cells, the texture is similar, and therefore, it is considered that the first standard deviations $\sigma 1a$ take similar values. In order to learn to which extent the values of the first standard deviations are similar to each other or different from each other among the plurality of smaller images classified to be of the same cell type, the standard deviation of the first standard deviations, namely, the second standard deviation is introduced.

As shown in FIG. 8B, as the first standard deviations $\sigma 1a$, $\sigma 1b$ and $\sigma 1c$ are plotted along the horizontal axis and the number of the smaller images corresponding to the first standard deviations is plotted along the vertical axis, the different cell types show different trends. In other words, as denoted at the curve A in FIG. 8B, since the pixel values do not vary greatly in the smaller images classified to be of iPS cells, the values of the first standard deviations $\sigma 1a$ are distributed within a relatively small value range. The average value in this distribution will now be referred to as $\mu 1a$ and the standard deviation (the second standard deviation) in this distribution will now be referred to as $\sigma 2a$. In the case of the smaller images which have a medium level of pixel value variations and are classified to be of differentiated cells, as denoted at the curve B in FIG. 8B, the values which the first standard deviations $\sigma 1b$ take are distributed within a medium range. The average value in this distribution will now be referred to as $\mu 1b$ and the second standard deviation in this distribution will now be referred to as $\sigma 2b$. In the case of the smaller images which have the greatest pixel value variations and are classified to be of feeder cells, as denoted at the curve C in FIG. 8B, the first standard deviations $\sigma 1c$ are distributed within the widest range. The average value in this distribution will now be referred to as $\mu 1c$ and the second standard deviation in this distribution will now be referred to as $\sigma 2c$.

For each cell type, whether the first standard deviations are large or small is not necessarily correlated with whether the second standard deviation is large or small. That is, as clearly understood from the definition of the second standard deviation provided above, the second standard deviation is a numerical indicator of how much the first standard deviations vary. Hence, even when the first standard deviations take large values since the pixel values greatly vary within each one of the smaller images for example, if the variations of the pixel values are similar among the smaller images which are classified of the same cell type, the second standard deviation takes a small value.

In addition, as described above, according to the findings by the inventors of the invention, depending upon the size of the smaller images, how much the pixel values vary changes, namely, the values of the first standard deviations are different. The value which the second standard deviation takes therefore changes depending upon the size of the smaller images. FIGS. 8B and 8C show examples of how differently the distribution of the first standard deviations behaves as the size of the smaller images changes. That is, the example in FIG. 8B is indicative of the result of executing the steps S002 through S005 described earlier under the condition that the smaller images have a first size, while the example in FIG. 8C is indicative of the result of executing the steps S002 through S005 described earlier under the condition that the smaller images have a second size which is different from the first size.

In the example in FIG. 8B, the range which is double the standard deviation $\sigma 2b$ about the average value $\mu 1b$ in the distribution of the first standard deviations (the curve B) in the smaller images classified to be of differentiated cells, namely, the range ($\mu 1b \pm \sigma 2b$) (which will be hereinafter referred to as "the central range of the curve B) partially overlaps the range which is double the standard deviation $\sigma 2c$ about the average value $\mu 1c$ in the distribution of the first standard deviations (the curve C) in the smaller images classified to be of feeder cells, namely, the range ($\mu 1c \pm \sigma 2c$) (which will be hereinafter referred to as "the central range of the curve C).

This means that as for both the smaller images which should be classified to be of differentiated cells and the smaller images which should be classified to be of feeder cells, the first standard deviations within the overlap area can have the value $\sigma x$ at a relatively high probability. In other words, it can be said there is not a significant difference between the distribution of the first standard deviations in the group of the smaller images containing many differentiated cells and that in the group of the smaller images not containing many differentiated cells. Hence, if any smaller image has the first standard deviations taking the value $\sigma x$ which is in the overlapping range, it is not possible to judge whether to classify this smaller image as feeder cells or differentiated cells. This can cause erroneous judgment in the culture quality evaluation process.

Meanwhile, in the example in FIG. 8C, the range which is double the standard deviation $\sigma 2a$ about the average value $\mu 1a$ in the distribution of the first standard deviations (the curve A) in the smaller images classified to be of iPS cells, namely, the range ($\mu 1a \pm \sigma 2a$) (which will be hereinafter referred to as "the central range of the curve A) does not overlap the central range of the curve B, and the central range of the curve B does not overlap the central range of the curve C. This means that it is possible to segregate at a high probability the smaller images containing many differentiated cells from the smaller images not containing many differentiated cells only from the values of the first standard deviations which are calculated directly from the pixel values. In other words, it can be said that there is a significant difference between the distribution of the first standard deviations in the group of the smaller images containing many differentiated cells and that in the group of the smaller images not containing many differentiated cells. It is similarly possible to segregate the smaller images dominated by iPS cells from the smaller images dominated by feeder cells.

Therefore, the steps S002 through S005 may be executed while changing the size of the smaller images, such a size of the smaller images may be identified which will give rise to a significant difference between the distribution of the first standard deviations in the group of the smaller images classified to be of differentiated cells and that in the group of other smaller images, and the original image may then be divided into smaller images of thus identified size in the culture quality evaluation process.

The specific method for determining the size of the smaller images will now be described with reference to FIG. 6 again. At the stage of dividing the sample image into smaller images of a certain size, when the second standard deviation calculated on a group of smaller images classified to be of differentiated cells is not significantly different from other smaller images (NO at Step S006), the size for dividing into the smaller images is changed (Step S010), and the process from the step S002 is executed once again. On the other hand, when the second standard deviation calculated on the group of smaller images classified to be of differentiated cells is significantly different from the other smaller images (YES at Step S006), the size of the smaller images as it is is set as the size of the smaller images Ip at the step S106 of the culture quality evaluation process (Step S007). In this manner, the parameter (1) among the parameters above is determined.

Further, when any smaller image obtained by division into this size primarily contains differentiated cells, it is possible to conclude that the value which the first standard deviation of this smaller image can take is within the range of ($\mu 1b \pm \sigma 2b$) at a high probability. Hence, this range can be applied to the culture quality evaluation process as "the predetermined range" at the step S108 of the culture quality evaluation process (Step S008). When the first standard deviations corresponding to differentiated cells are distributed within a range of larger numerical values than the first standard deviations corresponding to the other types of cells, e.g., when the curves A, B and C in FIG. 8C respectively correspond to iPS cells, feeder cells and differentiated cells, "the predetermined range" corresponding to differentiated cells may be expanded toward the farther side from the distributions representing the other types of cells, namely, toward the larger numerical value side. In other words, "the predetermined range" may be a range in which the first standard deviations are equal to or larger than ($\mu 1c - \sigma 2c$) in this case. A similar concept may be used when the first standard deviations corresponding to differentiated cells are distributed toward the smaller numerical values than the first standard deviations corresponding to the other types of cells. In this manner, the parameter (2) among the parameters above is determined.

Once the size of the smaller images Ip into which the original image Io is divided is fixed in this fashion, the total number of the smaller images Ip contained in the known original image Io is determined. Hence, the threshold value (3) for "the smaller images whose pixel values have the standard deviations which are within the range (2)" remains technically equivalent whichever of "the number of the smaller images which meet the condition," "the ratio of the number of the smaller images which meet the condition to the total number of the smaller images" and "the ratio of the combined area size of the smaller images which meet the condition to the total area size of the original image" is used to gauge the threshold value (3).

As described above, the culture quality evaluation process according to the embodiment requires the following for the purpose of evaluating whether the culture condition for maintenance culture of a pluripotent stem cell is favorable or poor. That is, a pluripotent stem cell is cultured under the predetermined culture condition, the sample is thus created, and the original image is obtained by imaging proliferated cell colonies. The original image is divided into the smaller images of the predetermined size, and the standard deviation of the pixel values of the pixels contained in each smaller image is calculated. When the ratio of the number of the smaller images whose standard deviation values are within the predetermined range to the total number of the smaller images is equal to or lower than the threshold value, it is judged that the sample is an acceptable sample, whereas when the ratio is over the threshold value, it is judged that the sample is an unacceptable sample.

This structure makes it possible to presume to which extent differentiated cells are included in the original image only from the pixel values which are directly obtained from the original image and the values which the standard deviations of the pixel values take, and hence, to judge whether the culture quality is favorable or poor based upon the presumed extent. Since quantitative evaluation is possible without relying upon the operator's personal view, it is possible to achieve unvaried evaluation automatically from the captured images.

While a general practice in culture of a pluripotent stem cell is to inject a feeder cell into a culture medium, according to the findings by the inventors of the invention, it is possible to find a significant difference between the distribution of the standard deviations of pixel values of feeder cells and that of differentiated cells. Utilizing this, accurate evaluation is possible also on a sample which contains feeder cells.

Further, in the embodiment, the smaller images obtained by dividing the original image are classified into the plurality of categories (which are the cell type categories of iPS cells, feeder cells and differentiated cells) in accordance with the values which the standard deviations of the pixel values in the smaller images take, and the smaller images whose values of standard deviations are within the predetermined range are classified into the same category. In this structure, the number of the smaller images classified into the category which is for those smaller images whose standard deviation values are within the predetermined range serves as a gauge which indicates the proportion of differentiated cells in the original image, based upon which whether the culture quality is favorable or poor is evaluated.

To acquire the original image, the image of the sample needs be captured in such a manner that cell colonies are distributed all over the original image. In this structure, the cell colonies are contained in all smaller images which are obtained by dividing the original image, thereby eliminating any smaller image which will not contribute to evaluation and enhancing the accuracy of the evaluation.

Further, in the embodiment, the size of the smaller images which are cut out from the original image of the sample is determined in the following manner. The sample images are first captured which contain pluripotent stem cells, feeder cells and differentiated cells. The first standard deviations are calculated which are the standard deviations of the pixel values contained in the smaller images which are obtained by dividing the sample images, and the average value of the first standard deviations calculated as for the smaller images and the second standard deviation, which is the standard deviation of the first standard deviations, are thereafter calculated. This is followed by identification of the central range which is the range within which the values of the first standard deviations are equal to or smaller than twice the second standard deviation about the average value. This process is executed on the sample images while changing the size of the smaller images over multiple levels. Under the condition that all smaller images have the same size, the size of the smaller images to use in the culture quality evaluation process is such a size with which the central range in the image of differentiated cells does not overlap the central range in the image of pluripotent cells or the central range in the image of feeder cells.

This structure makes it possible to segregate the smaller images primarily containing differentiated cells from the other smaller images at a high probability, and hence, accurately extract a region of differentiated cells contained in the original image, thereby enhancing the accuracy of evaluation.

Further, the embodiment requires determining the range of the numerical values of the second standard deviation which is for judging whether the smaller images correspond to differentiated cells or not based upon the average value of the first standard deviations and upon the second standard deviation which correspond to the size of the smaller images for use in the culture quality evaluation process from among the average values and the second standard deviations calculated from the images of differentiated cells. In this structure, since the range of the numerical values is established which reflects the distribution of the standard deviations of the pixel values corresponding to thus set size of the smaller images, it is possible to accurately extract the smaller images which contain differentiated cells.

As described above, in this embodiment, the culture quality evaluation process in the flow chart shown in FIG. 2 realizes "the culture quality evaluation method" according to the invention and the steps S101 through S104 shown in FIG. 3 correspond to "the first step" according to the invention. The Step S105 corresponds to "the second step" according to the invention. The steps S106 through S107 correspond to "the third step" according to the invention, while the steps S108 through S109 correspond to "the fourth step" according to the invention.

The invention is not limited to the embodiment above but may be modified in various manners besides the embodiment above to the extent not deviating from the object of the invention. For instance, the culture system 1 in the embodiment above is a culture system in which the incubator unit 10 for culture of a sample, the imaging unit 30 for image capture of a sample and the controller unit 40 for execution of the image processing are integrated with each other. However, the culture quality evaluation method according to the invention is applicable even when these units are formed as separate structures.

For instance, the imaging unit 30 in the embodiment above approximately horizontally holds the sample container C such as a dish which carries a biological sample to be image-captured, allows the irradiation light to impinge upon the sample to be image-captured, receives the light toward below transmitted from the sample to be image-captured and images the image of the sample. However, the relationship of these positions is not limiting. Instead, the irradiation light may impinge upon the sample to be image-captured from below and the light toward above transmitted by the sample to be image-captured may be received for example.

Further, while the transportation robot 20 transports the sample container C between the incubator unit 10 and the imaging unit 30 in the culture system 1 in the embodiment above, the operator may manually transport the sample container for instance.

Further, successive cultivation or exchange of the medium is performed when the sample is judged to be acceptable, whereas when the sample is judged to be unacceptable, the sample is discarded for example in the culture quality evaluation process according to the embodiment above. However, handling of the sample after this judgment is not limited to this but may be freely decided.

Further, while the foregoing has described iPS cells as an example of pluripotent stem cells in the embodiment above, the culture quality evaluation method according to the invention is applicable to maintenance culture which generally uses pluripotent stem cells.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A culture quality evaluation method, comprising: a first step of culturing a pluripotent stem cell under a predetermined culture condition and thereby creating a sample; a second step of imaging a proliferated cell colony in the sample and accordingly capturing an original image; a third step of dividing the original image into smaller images of a predetermined size and calculating standard deviations of pixel values of pixels contained in each one of the smaller images; and a fourth step of judging that the sample is an acceptable sample when a ratio of a number of the smaller images whose values of the standard deviations are within a predetermined range to a total number of the smaller images is equal to or smaller than a predetermined threshold value and judging that the sample is an unacceptable sample when the ratio is beyond the threshold value, wherein prior to the third step, an image of a pluripotent stem cell, an image of a feeder cell and an image of a differentiated cell differentiated from the pluripotent stem cell are acquired, a first sub step of calculating first standard deviations which are defined as the standard deviations of pixel values contained in each one of smaller images which are obtained by dividing the images, a second sub step of calculating an average value of the first standard deviations calculated on a plurality of smaller images and calculating a second standard deviation which is defined as a standard deviation of the first standard deviations, and a third sub step of identifying a central range which is defined as a range of first standard deviations within which the values of the first standard deviations are equal to or smaller than twice the second standard deviation about the average value are executed on the images while changing the size of the smaller images over multiple levels, and the size of the smaller images to use at the third step is determined as such a size with which the central range in the image of the differentiated cell does not overlap the central range in the image of the pluripotent cell or the central range in the image of the feeder cell under the condition that the smaller images have the same size wherein the steps are executed by one or more processors.

2. The culture quality evaluation method of claim 1, wherein the culturing is performed using a culture medium which contains a feeder cell at the first step.

3. The culture quality evaluation method of claim 1, wherein at the fourth step, the smaller images are classified into a plurality of categories in accordance with the values which the standard deviations take, and the smaller images whose values of the standard deviations are within the predetermined range are classified into same category.

4. The culture quality evaluation method of claim 1, wherein the sample is imaged such that the cell colony is distributed all over the original image at the second step.

5. The culture quality evaluation method of claim 1, wherein from among the average values and the second standard deviations calculated from the image of the differentiated cell, based upon the average value and the second standard deviation which correspond to the size of the smaller images used at the third step, the predetermined range at the fourth step is determined.

* * * * *